(12) United States Patent
Carlier

(10) Patent No.: US 11,697,472 B2
(45) Date of Patent: Jul. 11, 2023

(54) FRAME FOR BICYCLE, CONNECTOR AND BICYCLE

(71) Applicant: VanMoof B.V., Amsterdam (NL)

(72) Inventor: Ties Jonan Midas Carlier, Amsterdam (NL)

(73) Assignee: VANMOOF B.V., Amsterdam (NL)

( * ) Notice: Subject to any disclaimer, the term of this patent is extended or adjusted under 35 U.S.C. 154(b) by 629 days.

(21) Appl. No.: 16/607,277

(22) PCT Filed: Apr. 26, 2018

(86) PCT No.: PCT/NL2018/050279
§ 371 (c)(1),
(2) Date: Oct. 22, 2019

(87) PCT Pub. No.: WO2018/199763
PCT Pub. Date: Nov. 1, 2018

(65) Prior Publication Data
US 2020/0385087 A1     Dec. 10, 2020

(30) Foreign Application Priority Data

Apr. 26, 2017  (NL) ..................................... 2018795
Apr. 17, 2018  (NL) ..................................... 2020780

(51) Int. Cl.
*B62M 6/90*     (2010.01)
*B62J 9/27*     (2020.01)
(Continued)

(52) U.S. Cl.
CPC .................. *B62M 6/90* (2013.01); *B62J 9/27* (2020.02); *B62J 50/225* (2020.02); *B62K 3/04* (2013.01); *B62K 19/20* (2013.01); *B62K 19/40* (2013.01)

(58) Field of Classification Search
CPC ... B62M 6/90; B62J 9/27; B62J 50/225; B62J 45/00; B62K 3/04; B62K 19/20; B62K 19/40
See application file for complete search history.

(56) References Cited

U.S. PATENT DOCUMENTS 2,199,536 A    5/1940 Booty
5,211,415 A    5/1993 Gasiorowski
(Continued)

FOREIGN PATENT DOCUMENTS

CN    206107466 U    4/2017
DE        3830961  * 3/1990
(Continued)

*Primary Examiner* — Minnah L Seoh
*Assistant Examiner* — Marlon A Arce
(74) *Attorney, Agent, or Firm* — The Webb Law Firm

(57) ABSTRACT

The present invention relates to a frame for a bicycle including a tube construction for providing fastening options for further parts of the vehicle, such as a steering pen, saddle pen and fastening means for a rear wheel. The tube construction includes: a top tube, substantially extending in horizontal direction; a saddle tube, downwardly extending from a tube intersection with the top tube, from a fastening to the top tube at a substantially rear side thereof; a bottom tube, extending from a tube intersection with the saddle tube at substantially an underside of the saddle tube towards a connection at the top tube forwardly arranged relative to the fastening of the settled tube to the top tube; and a head tube arranged at an angle by means of a tube intersection connected to the top tube. The bottom tube extends to a predetermined distance above the upper side of the top tube, crossing the top tube at a tube intersection, and the head tube is fastened to the bottom tube above the top tube.

37 Claims, 18 Drawing Sheets

(51) Int. Cl.
*B62J 50/21* (2020.01)
*B62K 3/04* (2006.01)
*B62K 19/20* (2006.01)
*B62K 19/40* (2006.01)

(56) References Cited

U.S. PATENT DOCUMENTS

| | | | |
|---|---|---|---|
| 8,469,381 B2 | 6/2013 | Man et al. | |
| D802,487 S * | 11/2017 | Petrov | D12/111 |
| 9,902,457 B2 | 2/2018 | Hu et al. | |
| 9,969,455 B2 | 5/2018 | Kwag et al. | |
| 10,137,954 B2 * | 11/2018 | Hendey | B62M 6/90 |
| 10,377,438 B2 * | 8/2019 | Prommel | B62K 3/04 |
| 11,260,935 B2 * | 3/2022 | Reimers | B62K 11/14 |
| 11,338,873 B2 * | 5/2022 | Radenbaugh | B62J 25/04 |

FOREIGN PATENT DOCUMENTS

| | | |
|---|---|---|
| DE | 3830961 A1 | 3/1990 |
| DE | 102010035793 A1 | 3/2012 |
| DE | 102011111504 A1 | 2/2013 |
| EP | 1982909 A1 | 10/2008 |
| EP | 2423096 A2 | 2/2012 |
| EP | 3025947 A1 | 6/2016 |
| KR | 1020150106512 A | 9/2015 |

* cited by examiner

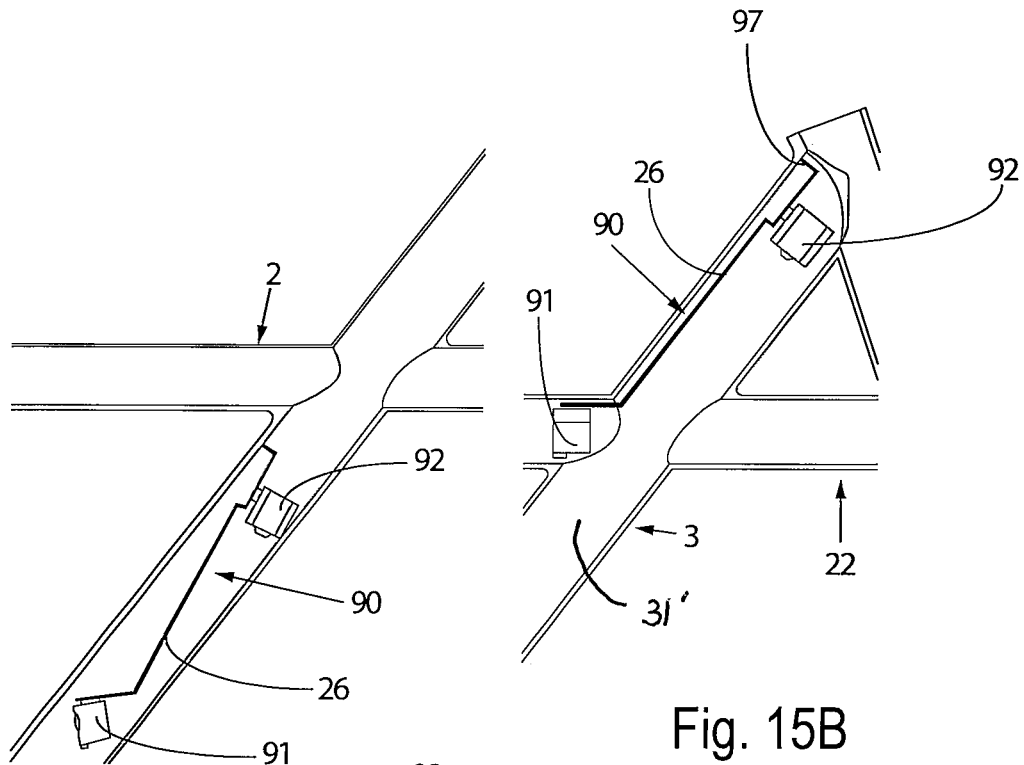
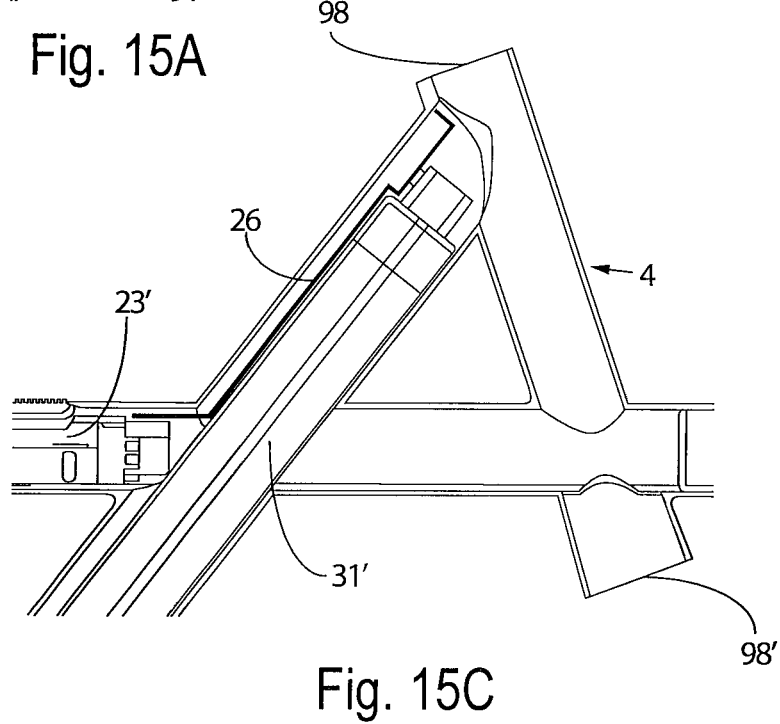

FRAME FOR BICYCLE, CONNECTOR AND BICYCLE

CROSS-REFERENCE TO RELATED APPLICATIONS

This application is the United States national phase of International Application No. PCT/NL2018/050279 filed Apr. 26, 2018, and claims priority to Dutch Patent Application Nos. 2018795 filed Apr. 26, 2017, and U.S. Pat. No. 2,020,780 filed Apr. 17, 2018, the disclosures of which are hereby incorporated by reference in their entirety.

BACKGROUND OF THE INVENTION

The present invention relates to a frame for a bicycle comprising a tube construction for providing fastening options for further parts of the vehicle, such as a steering pen, saddle pen and fastening means for a rear wheel. Furthermore, the present invention relates to a bicycle comprising the frame according to the present invention.

SUMMARY OF THE INVENTION

It is a purpose of the present invention to provide novelty features relating to arranging of accessories or parts providing functional improvements to the bicycle in a frame. To this end, the present invention comprises a frame for a bicycle comprising a tube construction for providing fastening options for further parts of the vehicle, such as a steering pen, saddle pen and fastening means for a rear wheel, the tube construction comprising:

a top tube, substantially extending in horizontal direction,
a saddle tube, downwardly extending from a tube intersection with the top tube, from a fastening to the top tube at a substantially rear side thereof,
a bottom tube, extending from a tube intersection with the saddle tube at substantially an underside of the saddle tube towards a connection at the top tube forwardly arranged relative to the fastening of the settled tube to the top tube,
a head tube arranged at an angle by means of a tube intersection connected to the top tube,
wherein the bottom tube extends to a predetermined distance above the upper side of the top tube, crossing the top tube at a tube intersection, and wherein the head tube is fastened to the bottom tube above the top tube.

An advantage according to the present invention is that with application of a relatively low top tube, also a relatively long bottom tube can be provided or applied. Because of this, it becomes possible to provide the relatively long bottom tube with and also relatively long battery with a complementary relatively high capacity. Such a relatively long battery is possible because the bottom tube extends from substantially the crankshaft tube tool in height past the top side of the top tube because of which a relatively long bottom tube is provided relative to a bottom tube that is known from the prior art that extends up to the bottom side of the top tube. Alternatively, it is possible to provide a relatively long battery with a relatively high capacity in the top tube, Bert for convenience of use, it is preferred to utilize the top tube for a number of other functions that require a user interface. With this, provision of the user interface in the top tube is advantageous for reachability.

A further advantage according to the present invention is that by means of such a frame, a bicycle can be provided with a relatively low top tube relative to the handlebar and or the saddle. Because of this, it becomes for example possible to provide a complex bicycle with usability for relatively short and relatively tall people. It is further possible to achieve the distance between the saddle and the top tube with such large dimensions that the bicycle may also be regarded as a lady bike while a generally horizontal top tube is applied.

According to a first preferred embodiment according to the present invention, the bottom tube is arranged for receiving of a drive battery for providing energy to a drive engine of the bicycle, wherein preferably the drive battery extends crossing the top tube. With this, in the above named advantages are achieved. Preferably, the bottom tube is arranged for providing a cylindrical space that extends from the bottom side of the bottom tube to the herbicide of the bottom tube.

According to a further preferred embodiment, the interior of the bottom tube defines a continuous receiving space, preferably extending from a access opening at the bottom side of the bottom tube, for receiving in this receiving space of at least one utility component for the purpose of providing a function to the bicycle. The rear side of the top tube preferably defines a receiving space in a similar manner extending from an access opening at the rear side thereof. Further preferably, the front side of the top tube defines a receiving space extending from an access opening at the front side thereof.

A further preferred embodiment relates to a frame and or a bicycle comprising the frame, wherein a drive battery is suitable for providing energy to a drive engine of the bicycle is arrangeable, or is arranged, in the bottom tube. With this, the said advantage of availability of the battery is achieved.

According to a further preferred embodiment, the crankshaft tube is arranged at the front side and or at the bottom side of the bottom tube. Because of this, the advantage is provided that an arrangement of the crankshaft tube relative to the bottom tube provides remaining axes to the bottom tube, such as receiving space therein. A further advantage that is provided is that the bottom tube can extend further downwardly behind the crankshaft tube then when these ends at the substantially top side of the crankshaft tube such as is known in the prior art. Because of this, the available length for applying of a battery is further enlarged relative to defined enlargement in the above of this length above the top tube.

According to a further preferred embodiment, the top tube is thicker than the bottom tube and wherein at the tube intersection between the top tube and the bottom tube, the bottom tube extends through the top tube. Alternatively, hereby the bottom tube is thicker than the top tube and wherein at the tube intersection between the top tube and the bottom tube the top tube extends through the bottom tube. Because of this, a passage from one tube through the other tube is realized because of which a convection, such as a welding connection can be achieved with a high of firmness, such as by means of a large contact surface of the welding connection with both tubes.

According to a further preferred embodiment, the top tube, preferably at the tube intersection with the bottom tube, is provided with a thickening, expansion, flare or swelling. With this, space is provided at the inside of the wall of the tube at the location of this thickening, expansion, flare or swelling. This space is usable for busing therethrough of at least a cable, such as for the purpose of connecting components that are located at opposite sides of the tube intersection.

Alternatively, hereby the bottom tube, preferably at the tube intersection with the top tube, is provided with a thickening, expansion, widening or swelling. This also provides such a defined advantage.

For the purpose of providing an alternative passage for a cable or connector, further preferably at a tube intersection, the thinner tube is provided with an opening for forming of a passage through this opening in the longitudinal direction of the thicker tube. Because at the location of the opening, material is removed, the cable can be guided through the space that was previously taken up by the removed material. An alternative optional way of providing a passage for a cable by means of providing an opening through the thinner tube is made by means of, a preferably transverse, through opening or by means of a removal of material from the wall of their thinner tube. In case for example only at one side of the tube a passage is required, a removal at that side suffices.

According to a further preferred embodiment, the tube intersection between the top tube and the head tube comprises a passage, such as an opening for passing through of a cable, such as the energy supply cable for the drive engine. By incorporating such a cable invisibly at the inside of the frame, safety is raised because of the high energy that is guided through such a cable. Furthermore, reliability is raised because the cable in the frame is substantially protected.

Further preferably, the top tube comprises flat surface for thereto, on or in arranging of a utility component, such as a control panel or a display. Further preferably, the bottom tube is an accessory tube that is arranged for arranging therein subsystems of the vehicle. With further preference, the top tube is an accessory tube that is arranged for arranging therein of subsystems of the vehicle for providing additional functionality to the vehicle. With this, it is advantageously achieved that a number of utility components advantageously are arrangeable at predetermined locations in or at a respective frame tube for providing functionality to the bicycle in an advantageous and safe manner and robust manner.

Depending on measurements or design, the top tube further preferably extends relative to the horizontal at an angle of maximally 20°, preferably maximally 15°, further preferably maximally 10°, further preferably maximally 5°.

According to a further preferred embodiment, the frame comprises a bicycle connector for connecting with a first cassette contact of a first bicycle cassette, the bicycle connector comprising:
  a first connector contact, comprising a number of connector poles, for connecting with the first cassette contact,
  at least one output contact for connecting with a respective subsystem,
  wherein the bicycle connector is arrangeable in the respective first tube element of the tube assembly.

Hereby, an important advantage is that at least a part of the subsystems of the bicycle are mutually connectable in a simple manner by means of the interconnection between a connector contact of the bicycle connector and a cassette contact of the bicycle cassette. Further preferably, the cassette contact is connected with the connector contact as simple plug contact connection. There with, all contacts are made via a simple operation.

A further report advantage here with is that a bicycle that is provided with a relative large of subsystems can be produced, assembled or maintained in a simple manner.

Furthermore, a central processing unit becomes coupleable in an advantageous and simple manner with each of the subsystems.

According to a further preferred embodiment, the frame comprises the bicycle connector for connecting with a first and a second cassette contact of the first bicycle cassette and a second bicycle cassette, the bicycle connector comprising:
  a second connector contact, comprising a number of second contact poles, for connecting with the second cassette contact,
  a number of pole connectors, such as comprising wires, for connecting of at least a part of the number of first contact poles of the first cassette contact with at least a part of the second contact poles of the second connector contact.

By means of such a preferred embodiment, it becomes possible in an advantageous manner provide an electrical connection between two tube elements of a bicycle, such as preferably between the top tube and the bottom tube. It is realized there with that a bicycle cassette in the top tube is connectable with a cassette in the bottom tube by means of a simple connector connection, such as similar to a plug connection. Connections between all tube elements of a bicycle are also provided within the understanding of the present invention and preferred embodiment.

An especially advantageous variant is the variant arranged in the top tube a central processing unit of the bicycle is arrangeable in a top tube cassette as variant of the bicycle cassette and in the bottom tube of the bicycle, a bottom tube cassette as variant of the bicycle cassette is arrangeable. There with, the top tube cassette and the bottom tube cassette are mutually connectable by means of the bicycle connector that as the first cassette contact in the top tube and the second cassette contact in the bottom tube. With placement of the top tube cassette or the bottom tube cassette, neatly all required connections between the cassettes and with further subsystems of the bicycle are made when the contact poles mutually interconnect.

According to a further preferred embodiment, the bicycle connector comprises a bridge element for mutually connecting of the first connector contact with the second connector contact, preferably for the purpose of providing a mutual orientation. It is advantageous when of the placement of the bicycle connector, the contacts are arranged in a suitable orientation for making contact with the first and or the second cassette contact. Furthermore, such a bridge provides dimensional stability to a combination of the first connector contact and the second connector contact for the purpose of easy handling thereof. Furthermore, such a bridge provides strength to a bicycle connector for protecting of the pole connectors.

According to a further preferred embodiment, the first connector contact and/or the second connector contact comprises contact poles for the purpose of transferring a charging current to a battery and/or a charging current to a drive motor of the bicycle. With this, it becomes for example possible to arrange a charging contact in a different tube element than the tube element in which the accumulator or battery is arranged, while the advantages of the bicycle connector or bicycle with bicycle connector according to the present invention maintain. Further preferably, the first connector contact and/or the second connector contact comprises contact poles for the purpose of transferring of an information signal or a control signal from a subsystem or to a subsystem. Further preferably, the bicycle comprises a combination of contact poles for the purpose of a charging current and contact poles for the purpose of an information signal or a control signal. Advantages thereof are indicated in the above.

For the purpose of a reliable placement of the cassette, the bicycle connector comprises guide means for guiding and or centering of the respective connector contact during mutual connection of the respective cassette contact and connector contact. With for example sliding in of the cassette in a tube element, such guide means are functional with the so-called' seeking' of contacts. Also the guide means provide a mutual firmness while the bicycle connector and the respective cassette are arranged in a mutual connection or position of use.

According to a further preferred embodiment, the contacts comprise pen contacts or ball contacts.

The mutual relative sizing of the bicycle connector and at least one tube element is further preferably such that the bicycle connector is passable through this tube element. This feature provides an advantage with placement or mounting of the bicycle connector in a tube element or in an intersection between two adjacent tube elements.

Further preferably, the bicycle connector is here with passable towards a coupling or bend between this tube element and a second tube element for arrangement at the location of this coupling or bend for the purpose of providing a connector connection between the first tube element and the second tube element by means of the bicycle connector. With this, specifically the connection between two adjacent tube elements is achieved.

For the purpose of a connection between the top tube and the bottom tube, further preferably the first cassette contact is functionally arrangeable in the top tube of the bicycle, and wherein the second cassette contact is functionally arrangeable in the bottom tube of the bicycle. With this, it is provided that the mutual arrangement is also implementable in an inverse manner, for example for arrangement of a battery in the top tube and a control unit in the bottom tube.

For the purpose of a stable mounting, the bicycle further preferably comprises fastening means for fastening of the bicycle connector in a functional position. Such a stable fastening provides as advantage that the connector contact is fixable for receiving of a cassette contact.

For the purpose of mounting in the tube element, the fastening means are arranged such that these are operable from the bottom side and or the top side of the head tube. To this end, preferably a screw connection is provided with a thread in or at the fastening means such as at the rich of the bicycle connector.

Further preferably, first and second cassette contact are each arranged for a respective connection function, or wherein the first and second cassette contact are identical. Depending on the application, cassettes with identical connectors or cassettes with two different functions are applied, such as one for a control unit, and one for a battery.

Further preferably, the tube element with therein arrangeable bicycle cassette have a mutual guiding shape such that the cassette is only arrangeable in the tube element in an orientation fitting with finding connection between the cassette contact and the connector contact. With this, a suitable orientation between the cassette contact and the connector contact is advantageously achieved.

A further aspect according to the present invention relates to a bicycle connector according to the present invention for a bicycle according to one or more of the preceding claims, comprising:
 a first connector contact, comprising a number of contact poles, for connecting with the first cassette contact,
 at least in output contact for connecting with a respective subsystem,
 wherein the bicycle connector is arrangeable in the respective first tube element of the tube assembly.

Such aspect provides advantages as indicated in relation to the above aspect.

According to a first preferred embodiment, such a bicycle connector comprises:
 a second connector contact, comprising a number of second contact poles, for connecting with the second cassette contact,
 a number of pole connectors, such as comprising wires, for connecting of at least a part of the first contact poles of the first cassette contact with at least a part of the number of second contact poles of the second connector contact.

According to a further preferred embodiment, such a bicycle connector comprises a bridge element for mutually connecting of the first connector contact with the second connector contact, preferably for the purpose of providing a mutual orientation.

A further aspect according to the invention relates to a bicycle cassette for holding at least a first of a number of subsystems, such as a control unit of the bicycle for providing of a respective function to the bicycle, wherein the first bicycle cassette:
 is arrangeable in at least a first tube element of the tube assembly,
 comprises a first cassette contact, comprising a number of contact poles, that is coupleable internally in the first bicycle cassette with the at least first of the number of subsystems.

A further preferred embodiment relates to such a bicycle cassette, wherein the bicycle cassette:
 is arrangeable in at least a second tube element of the tube assembly,
 comprises a second cassette contact, comprising a number of contact poles, that is coupleable internally with at least a further of the number of subsystems.

A further aspect according to the present invention relates to a bicycle comprising a frame according to the present invention. This aspect has similar advantages as described in the above in relation to the above aspect.

BRIEF DESCRIPTION OF THE DRAWINGS

Further advantages, features and details of the present invention will be further elucidated on the basis of a description of one or more embodiments with reference to the accompanying figures. Similar yet not necessarily identical parts of different preferred embodiments are indicated with the same reference numerals.

FIG. 15 relates to three schematic representations in side view of a further preferred embodiment according to the present invention.

DESCRIPTION OF THE INVENTION

Figure 1:
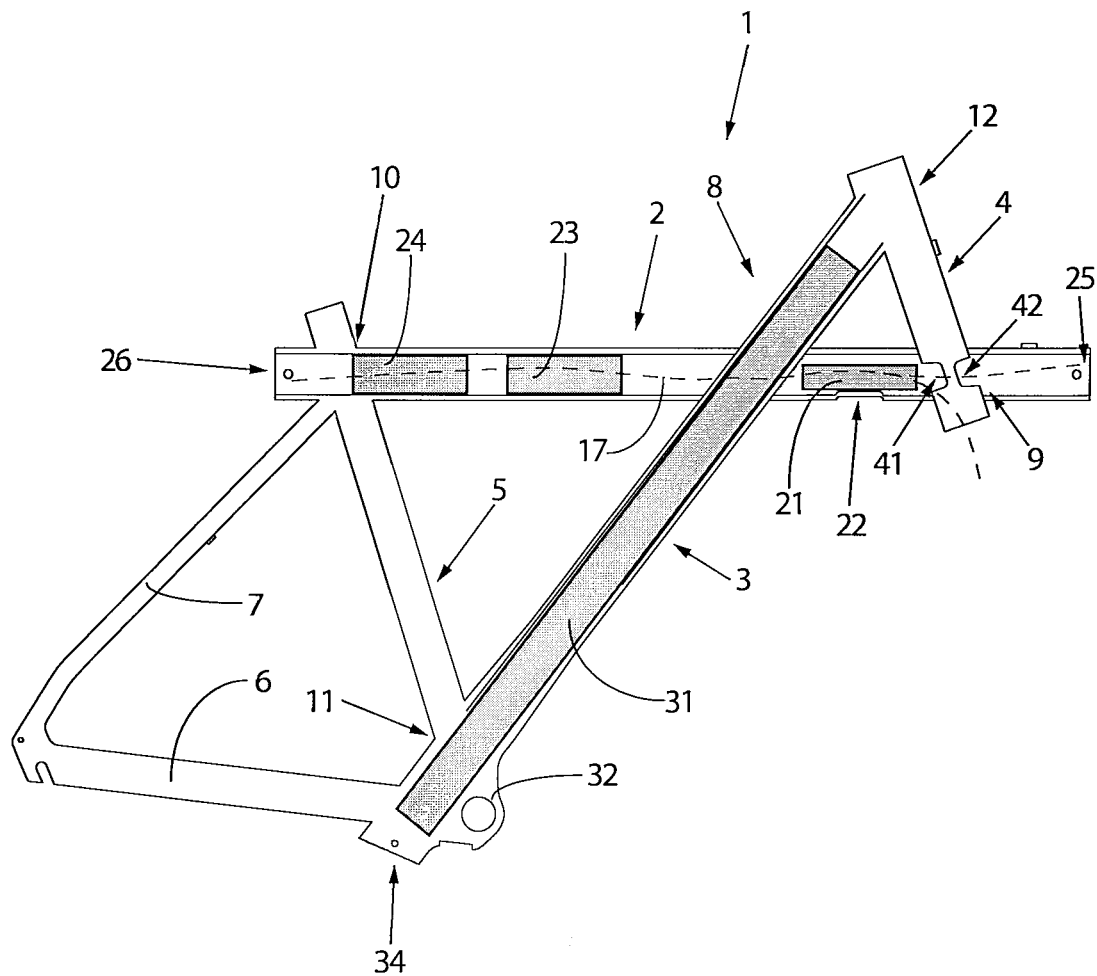
FIG. 1 relates to a schematic representation in side view of a first preferred embodiment according to the present invention.

A first preferred embodiment according to the present invention relates to a frame one. This frame comprises a tube construction comprising a bottom tube 3, a top tube 2, a head tube 4 and a saddle tube 5, with also a bottom stay 6 and a top stay 7.

The tubes are preferably welded together and are preferably aluminum tubes that are welded by means of aluminum welding. Hereby, tube intersections are formed where the tubes are crossing each other and welded together. The tube interconnection 10 is formed by the top tube with the saddle tube. The tube intersection 8 is formed by the top tube and the bottom tube. The tube intersection 9 is formed by the head tube with the top tube. The tube intersection 11 is formed by the saddle tube with the bottom tube. The tube intersection 12 is formed by the head tube with the bottom tube. The naming of the bottom tube is chosen based on the history of naming tubes of a substantially triangular frame. The present invention relates to a frame comprising an X shape wherein the X is formed by the bottom tube and the top tube. It is an important object of the X shape to have the bottom tube extend to above the top tube in order to provide a relatively long bottom tube for being able to accommodate a relatively long battery. Further goals and advantages are described in the above.

To this end, at the location of the tube intersection, material of a tube is removed such that it does not extend in the inner space of the tube intersection. Because of this, for example a battery pack can be slid in the tube while this is not hindered by a crossing tube at the location of a tube intersection. Providing of such an hindered passage is not a requirement with all tube intersections. In many preferred embodiments, the bottom tube extends at the location of the tube intersection with the top tube. Because of this, a certain firmness of the bottom tube is maintained at the location of the tube intersection with the top tube.

A battery pack 31 is arranged in FIG. 1 in the bottom tube 3. The battery pack has a length that is much bigger than when the bottom tube would merely extend from above the crankshaft tube 32 to a bottom side of the top tube 2.

Under application of for example a bicycle with relatively small wheels, such as 24 inch, 22 inch, 20 inch, 18 inch, 16 inch, it is herewith realized that the top tube can be arranged at a relatively small distance from the top side of the wheels in the frame. Because of this, advantages of the bike for ladies may be provided to a frame with a design of a bike for men with a horizontally extending continuous top tube.

In the top tube, a connector assembly 21 is arranged in the part of the top tube between the bottom tube and the head tube. Connector openings are arranged at the location of an opening 22 at the bottom side of the top tube. Further components that are arranged in the top tube relate to a board computer 24 and a battery control cassette 23. At the rear side, a rear light 26 is attached and at the front side a front light 25 is attached. The several components that are arranged in the top tube are mutually connected by means of cables 17, 18. Cable 18 fulfills the purpose of connecting the battery with the drive motor 8 that is arranged in the front wheel and is thus guided through the head tube.

For the purpose of passing of the cable through the top tube along the bottom tube and or along the battery pack, a number of alternative passage openings are provided.

Figure 3:
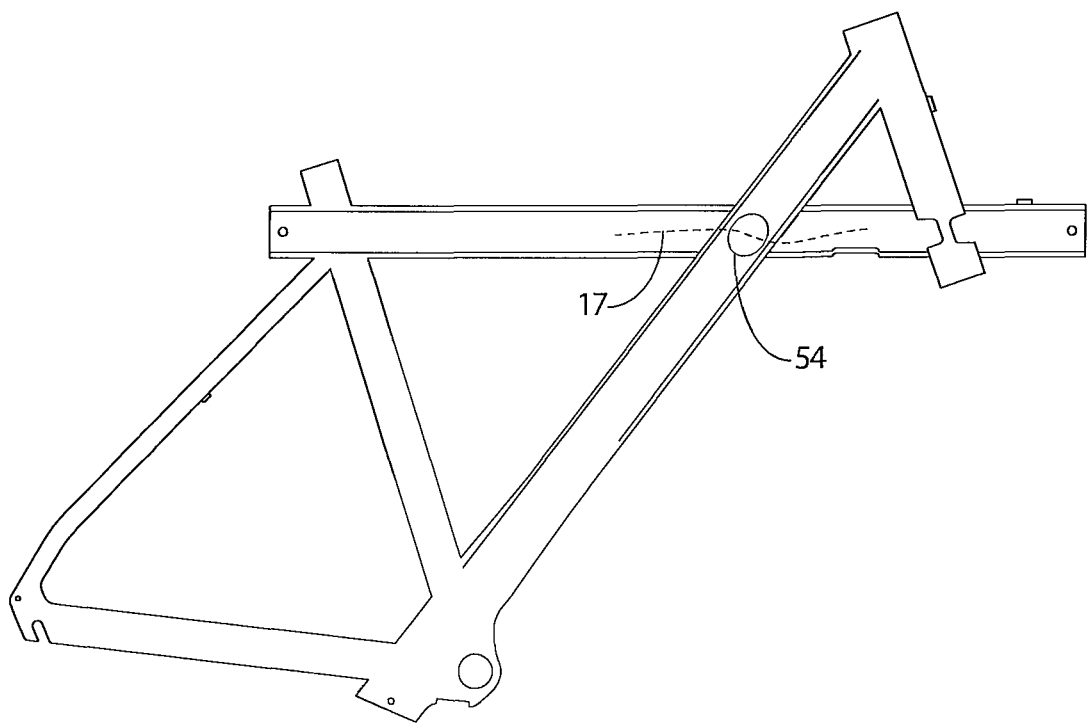
FIG. 3-14 relates to a further schematic representations.
Figure 4:
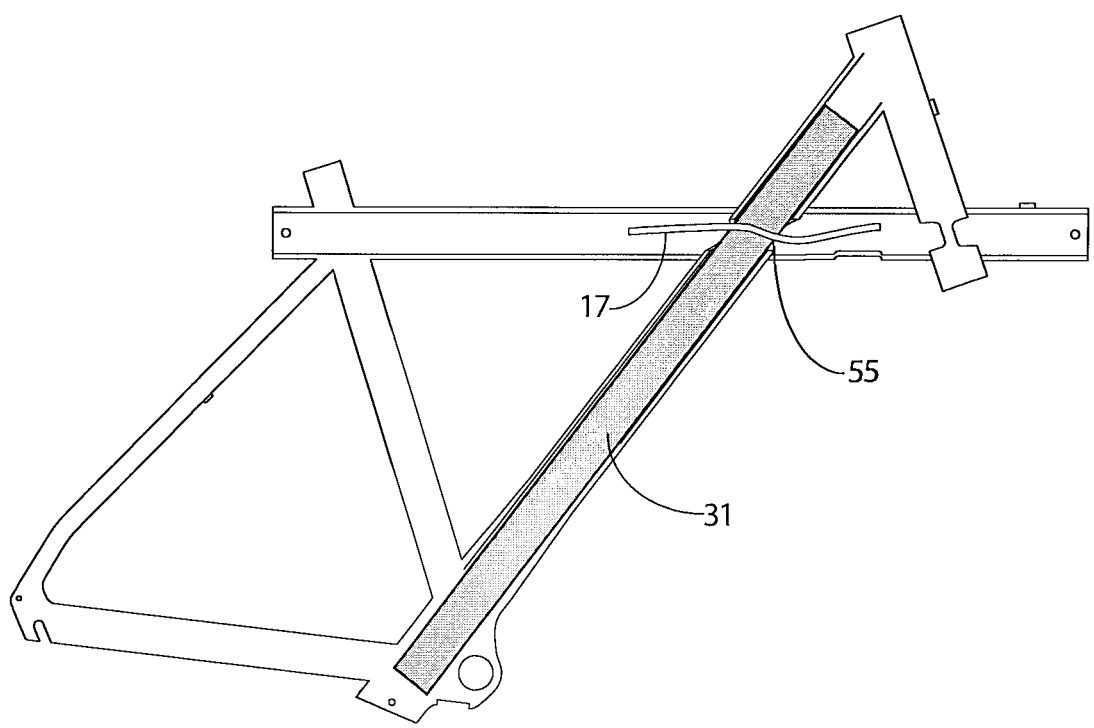
Figure 6:
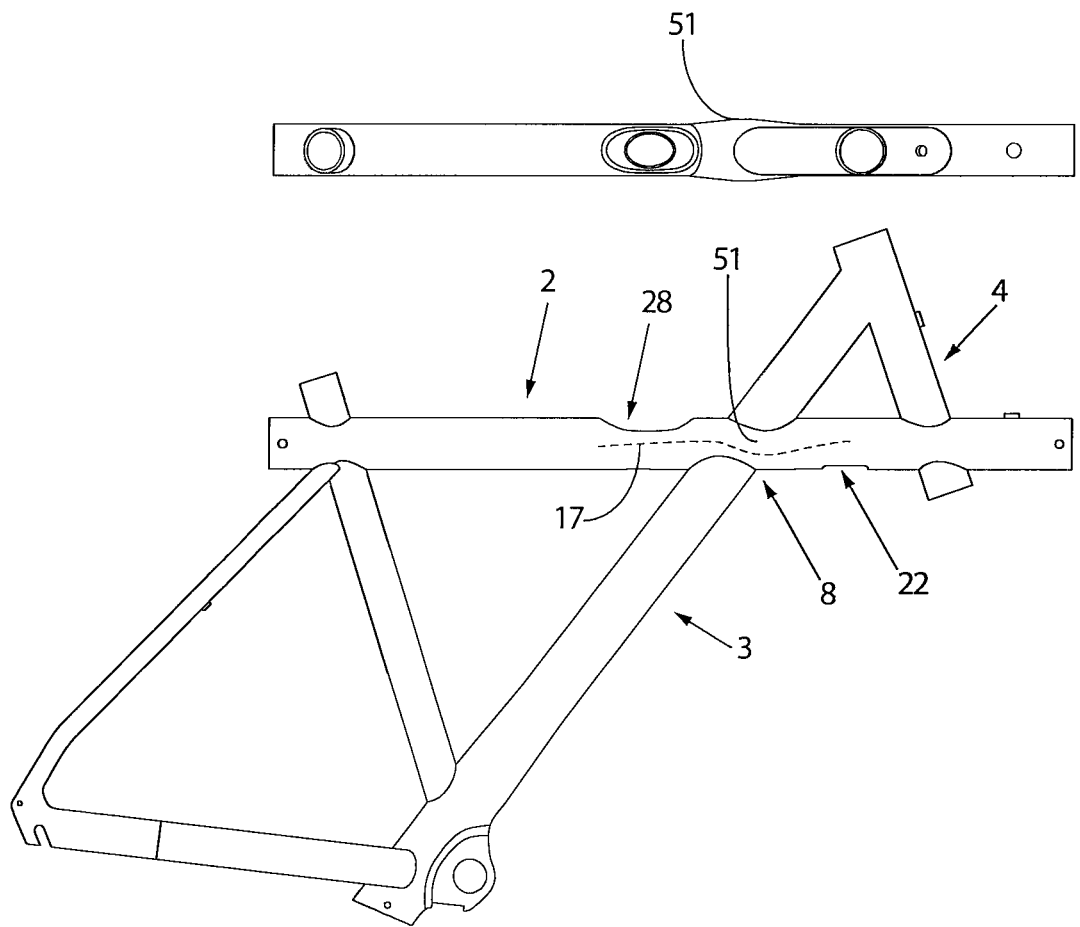
Figure 7:
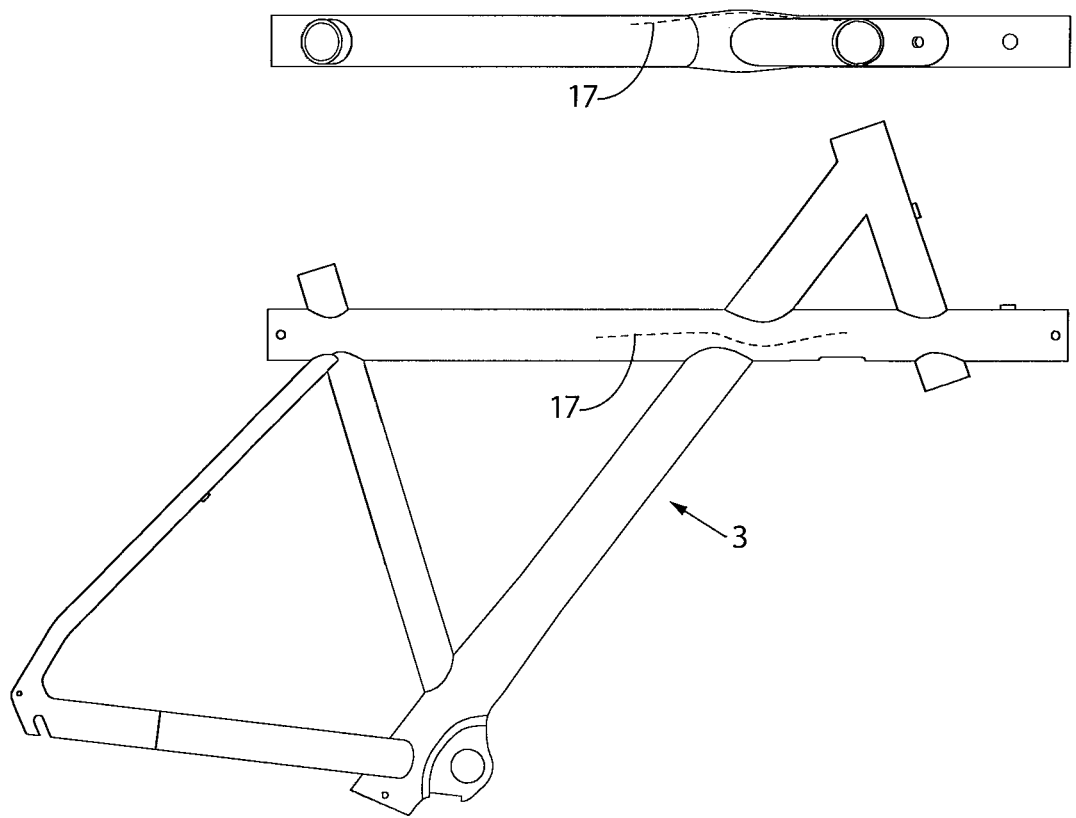
Figure 8:
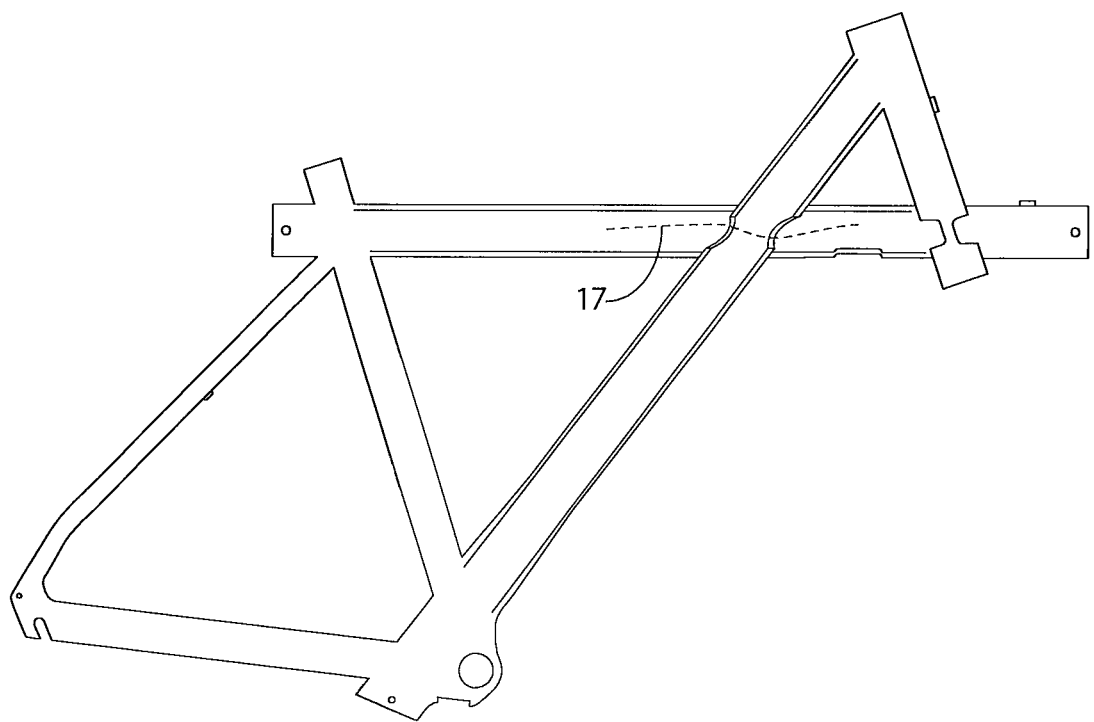
Figure 9:
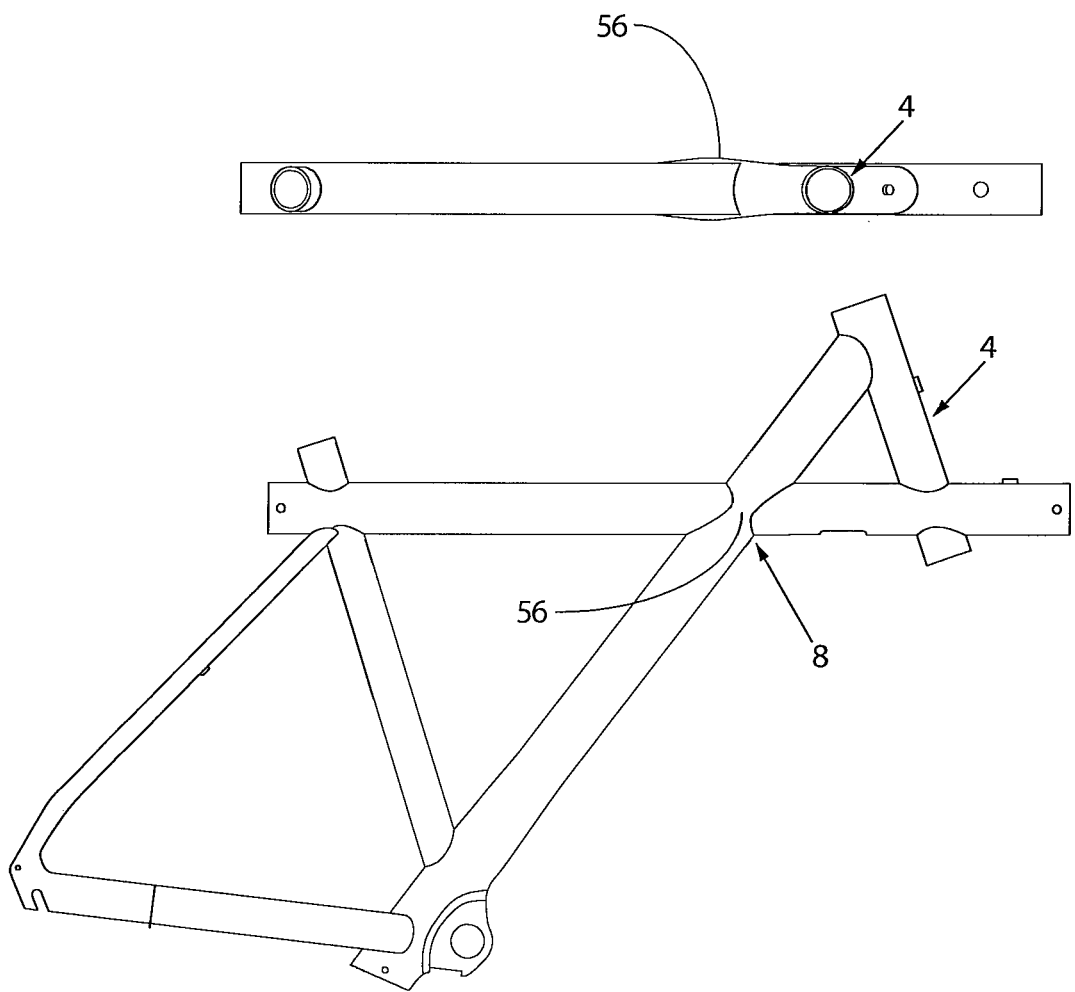
Figure 10:
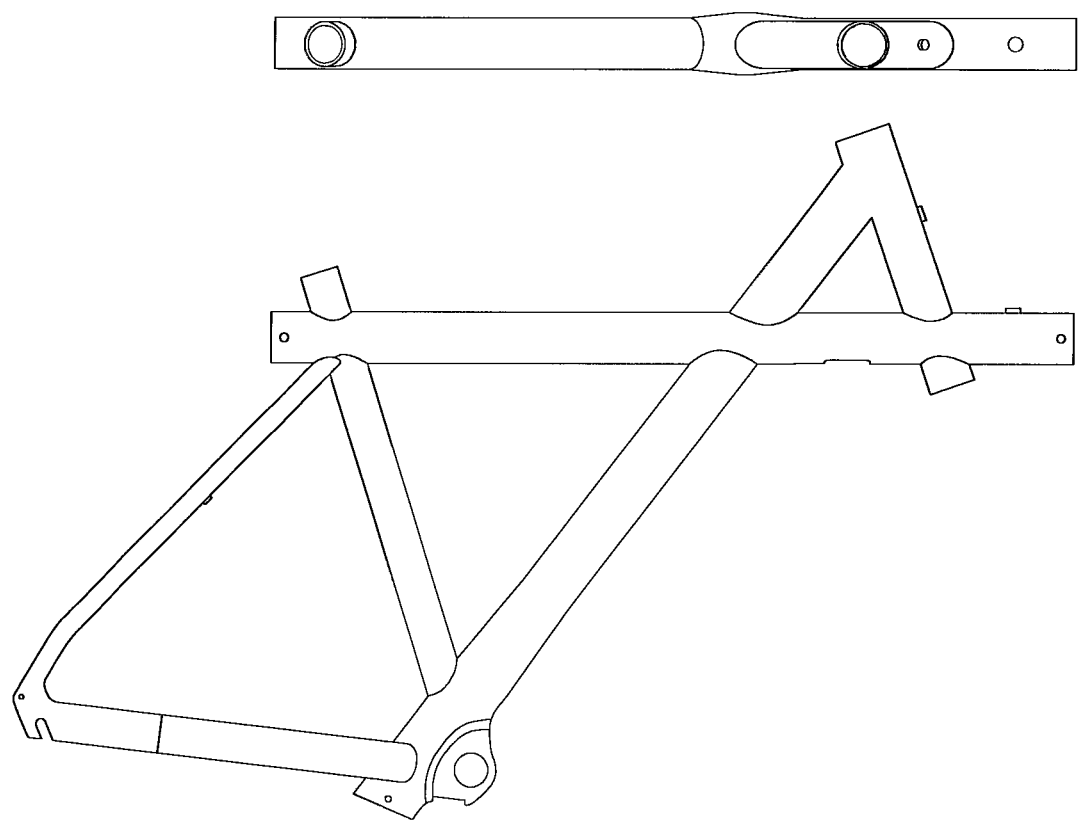
Figure 11:
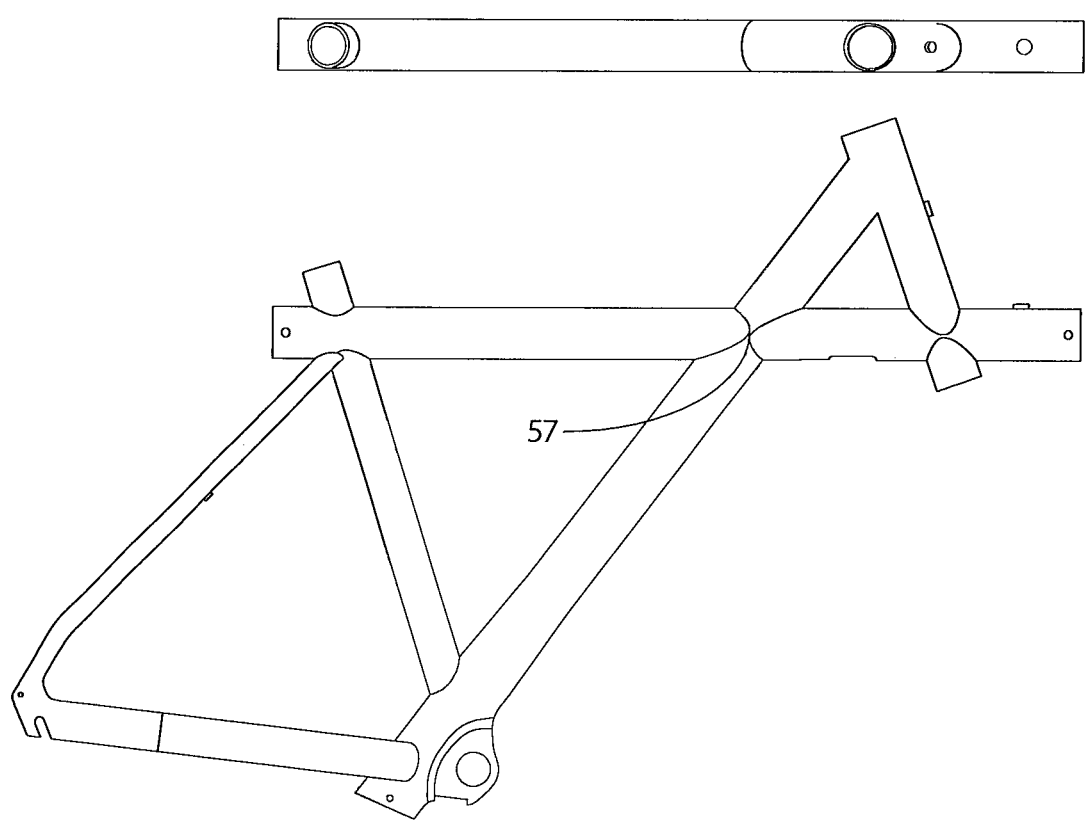
Figure 12:
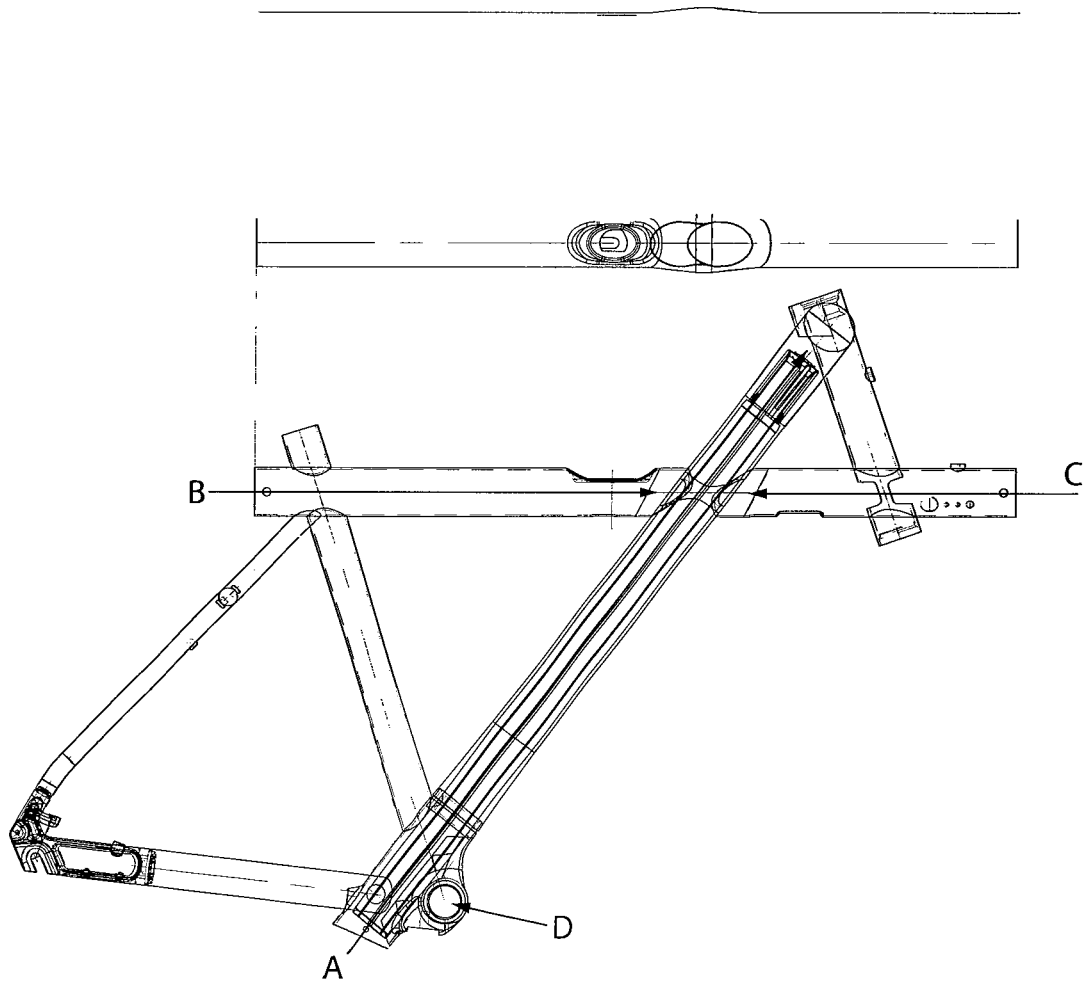
Figure 13:
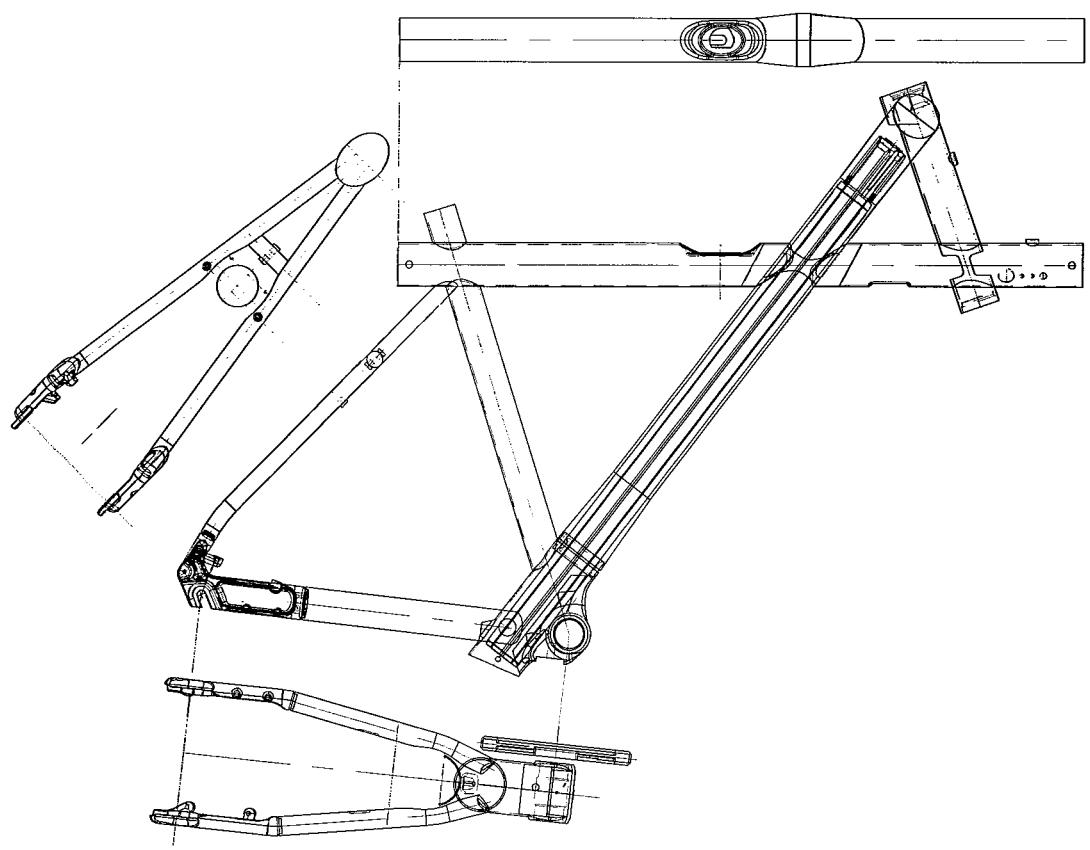
Figure 14:
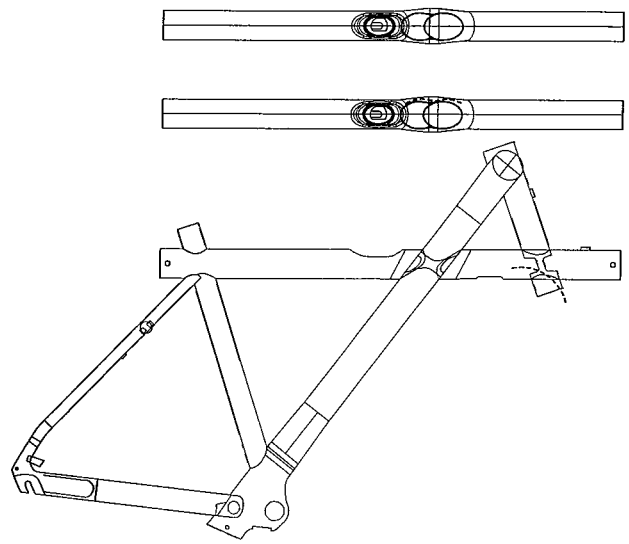
Figure 16:
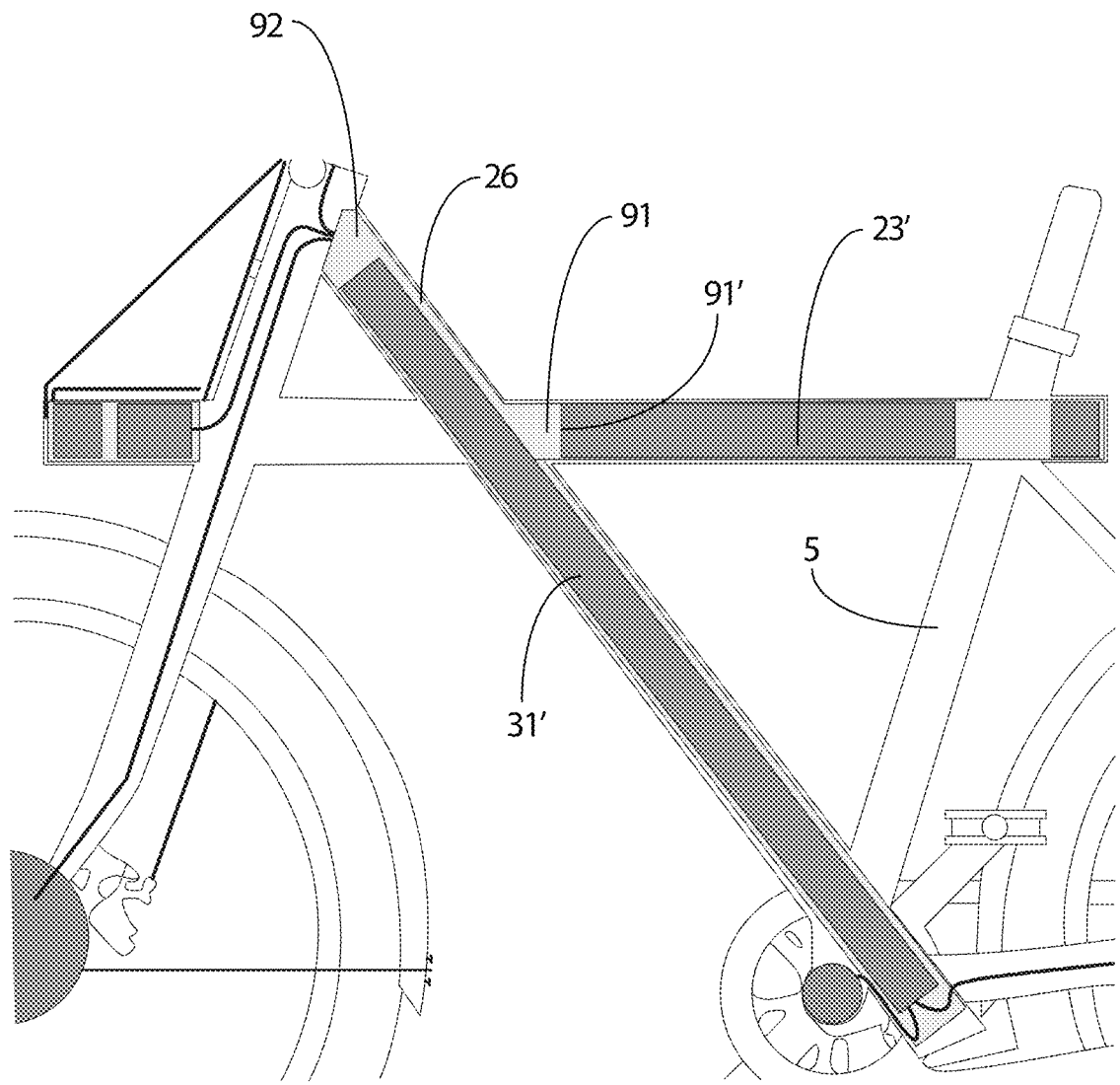
FIG. 16 relates to a schematic representation in side view of a further preferred embodiment.
Figure 17:
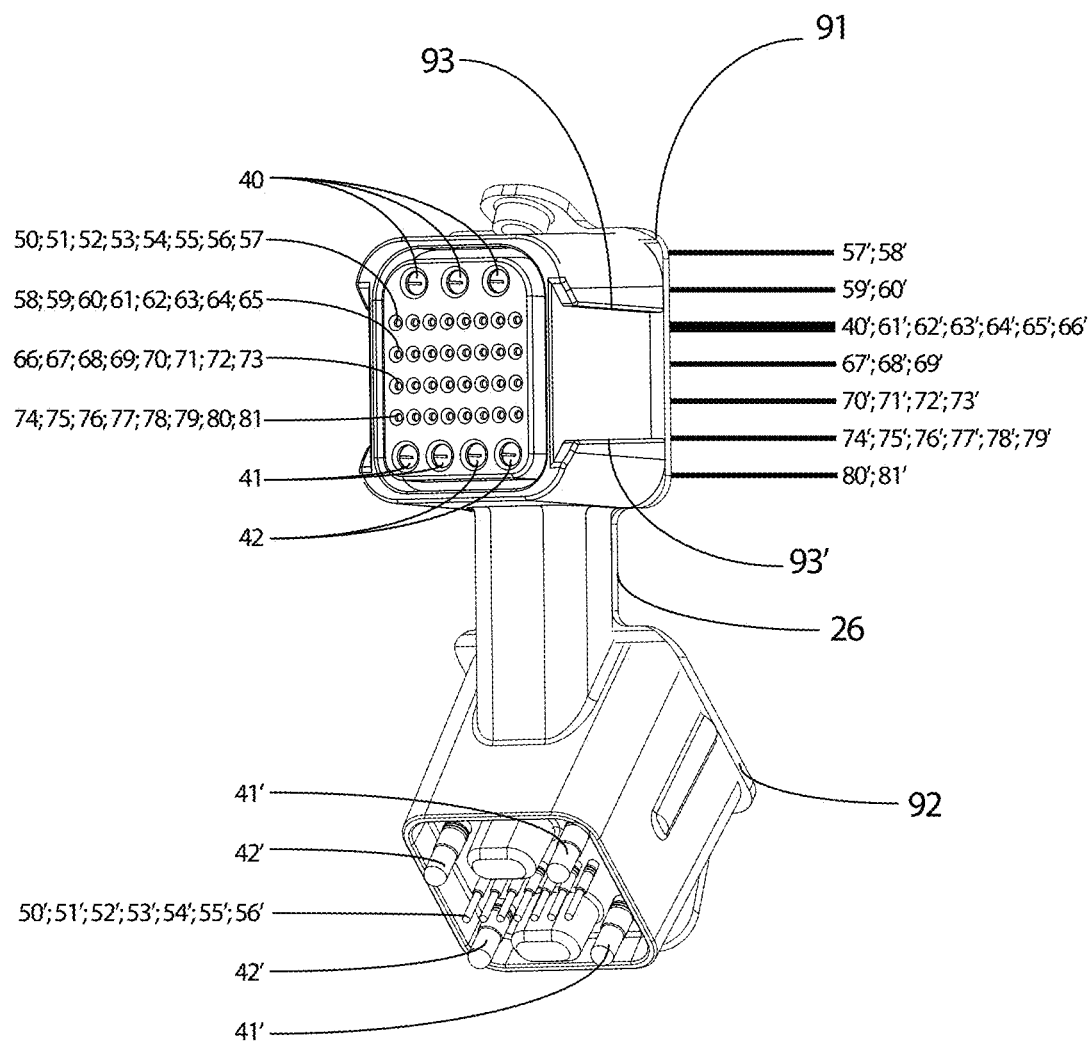
FIG. 17 relates to a schematic representation of a detail of the preferred embodiment according to FIG. 15 in perspective view.
Figure 18:
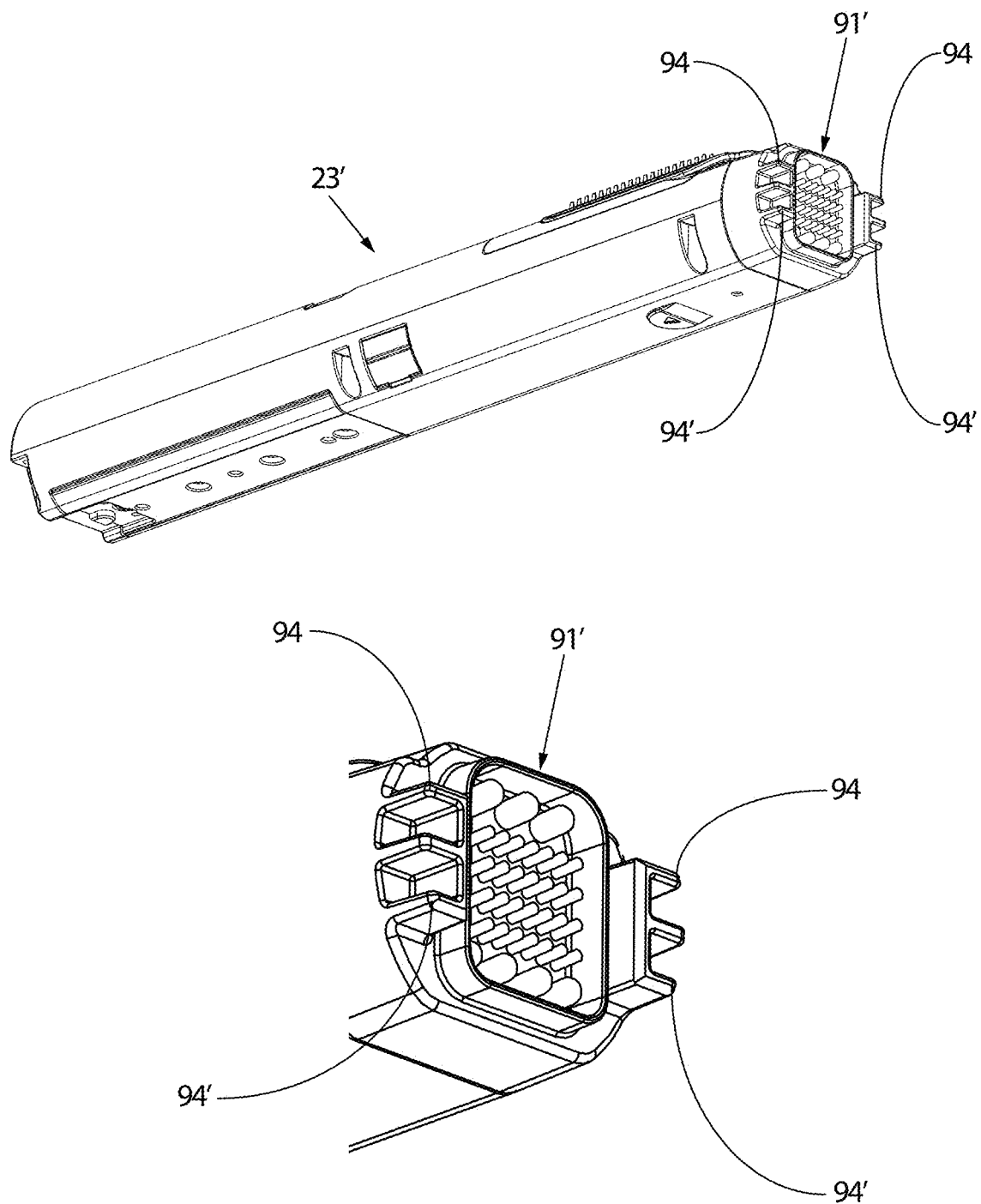
FIG. 18 relates to a schematic representation of a further preferred embodiment in perspective view.

Shown is the widening 51 (FIG. 6) of the top tube at the location of the tube intersection. Because of this, it becomes possible to guide the cable outside the bottom tube therepast. Alternatively, a removal 54 (FIG. 3) of material in the top tube is shown at one or both sides thereof. A removal 54 at both sides of the bottom tube is realized by providing of a through bore forming the removal. With this, at both sides of the bottom tube a cable can be guided through the top tube. A combination of the thickening 51 with the removal 54 naturally provides relatively more space for passing of the cables.

In an alternative manner, it is possible to thicken the bottom tube relative to the top tube. In such case, the thickening 51 is provided in the bottom tube and the removal is created in the top tube that is guided through the bottom tube in such case at the location of the tube intersection.

Furthermore, it is provided that a through opening in the longitudinal direction of the top tube is realized in the bottom tube. Through such an opening, cables are passable.

Alternatively, it is possible to provide both tubes at the location of a tube crossing with a thickening 51. Because of this, the full space within the tube crossing is enlarged which enables passing through of cables along for example a battery pack that is arranged through the tube intersection.

The several preferred embodiments of FIG. 6-14 are both shown in sideview as in top view in the variants of a similarly thick bottom tube and top tube, a thicker top tube then bottom tube and a thicker bottom tube then top tube.

In FIG. 15, a frame is shown comprising a bicycle connector 90 for arrangement in an intersection between a top tube 2 and a bottom tube 3 at the head tube 4. The bicycle connector 90 comprises a first connector contact 91 and a second connector contact 92. The first connector contacts 91 serves the purpose of connecting with a cassette 23' for arranging thereof in the top tube 2. The second connector contact 92 serves for connecting with a cassette 31' for arrangement thereof in bottom tube 3.

The top tube cassette 23' comprises a cassette contact 91' for connecting with a connector contact 91. The bottom tube 31' comprises a cassette contact (not shown) for correspondingly connecting with the connector contact 92.

The bottom tube cassette comprises a battery or accumulator for driving the bicycle by means of an electrical engine. Furthermore, the bottom tube cassette comprises a battery management system for optimality charging and discharging of the battery during use thereof and during charging thereof.

The top tube cassette 23' comprises a control unit 4 controlling of or co-functioning with several subsystems of the bicycle, such as a drive engine or a sensor therein, lock with sensor and solenoid therein, bell or horn function, bell button or horn button and or a tachometer. The pens of connector contact 91 and connector contact 92 have a function as follows.

Poles 40 provide power to a three-phase engine. Poles 41 relate to the negative pole of the battery. The poles 42 relate to the positive pole of the battery. The pole 50 relates to the pole for charging of the battery, as well as the poles 51 and 52. The pole 53 relates to a TX pole for communication with the battery. The pole 54 relates to an RX pole for communication with the battery. The pole 55 relates to an earth pole for the battery. The pole 56 relates to a fivefold VCC for the battery. The poles 57, 58 connect with the bell button. The poles 59, 60 connect with a boost button for raising the engine power of the drive engine of the bicycle. The poles 61, 62, 63 connecting with a hall sensor of the engine. The poles 64, 65 connected with an engine of a further subsystem. The pole 66 connects with a temperature sensor of the engine. The poles 67, 68 and 69 are as yet empty. The poles 70, 71, 72, 73 connect with a bicycle lock, a solenoid and a sensor switch thereof. The poles 74, 75, 76, 77 connect with a whole sensor of the tachometer of the crankshaft. The ball 78 connects with an earth of the tachometer of the crankshaft. The poles 80, 81 connect with the from plight of the bicycle.

Figure 2:
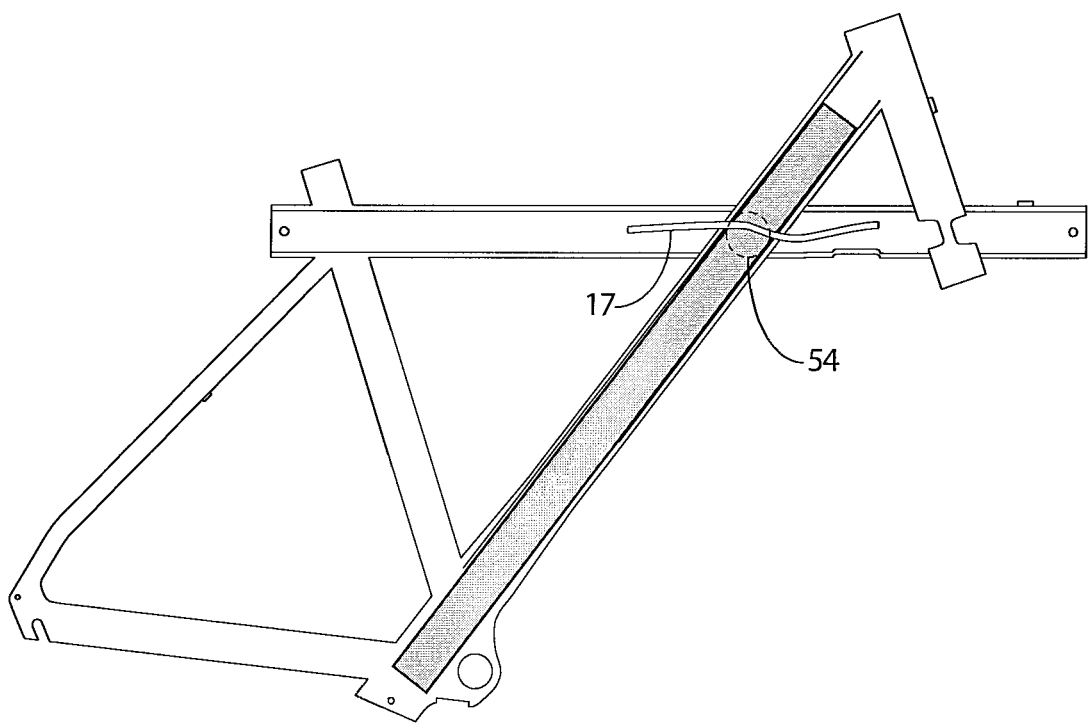
FIG. 2 relates to a schematic representation in side view of a further preferred embodiment according to the present invention.

Herewith, examples are provided of connections of the poles of the connector contact. The front end of the top tube cassette 23' comprises the cassette contact 61' thereof. The cassette contact 9' comprises poles or bends in correspondence with the poles as described with the connector contact one according to FIG. 2. Also the bottom tube cassette comprises poles in correspondence with the poles of the corresponding connector contact.

Because of this, according to the present invention, it becomes possible to easily place and or replace a cassette by sliding the same in the respective tube until the contacts are in mutual connection or inserted therein in a correct manner. Because of this, it is advantageously realized that all subsystems are connected with the cassette, the subsystems therein and or under central control of the bicycle in the top tube cassette, with a single connection operation. Also, it is provided that the functions of the cassette are applied in reverse, such that the battery is arranged in the top tube order control unit is arranged in the bottom tube. It is furthermore provided that such a bicycle connector is embodied single sidedly for the variant that merely a bottom tube cassette or a top tube cassette is applied in the bicycle. This is for example the case in case a bicycle has a control unit, but for example does not have a drive motor with a thereto belonging battery or accumulator.

The connector is provided with a guiding edge 94, 94' for guiding of ribs 93, 93' of the front end of the cassette or of the cassette contact. Because of this, it is realized that pressing of the cassette such that the poles come into contact with each other can only be performed when the mutual orientation is sufficiently accurate. With this, also a 'seeking' function is provided for the purpose of correctly inserting of the contacts of the cassette in the context of the bicycle connector and vice versa, depending of the orientation of the male/female connections that are also considered reversibly.

Figure 5:
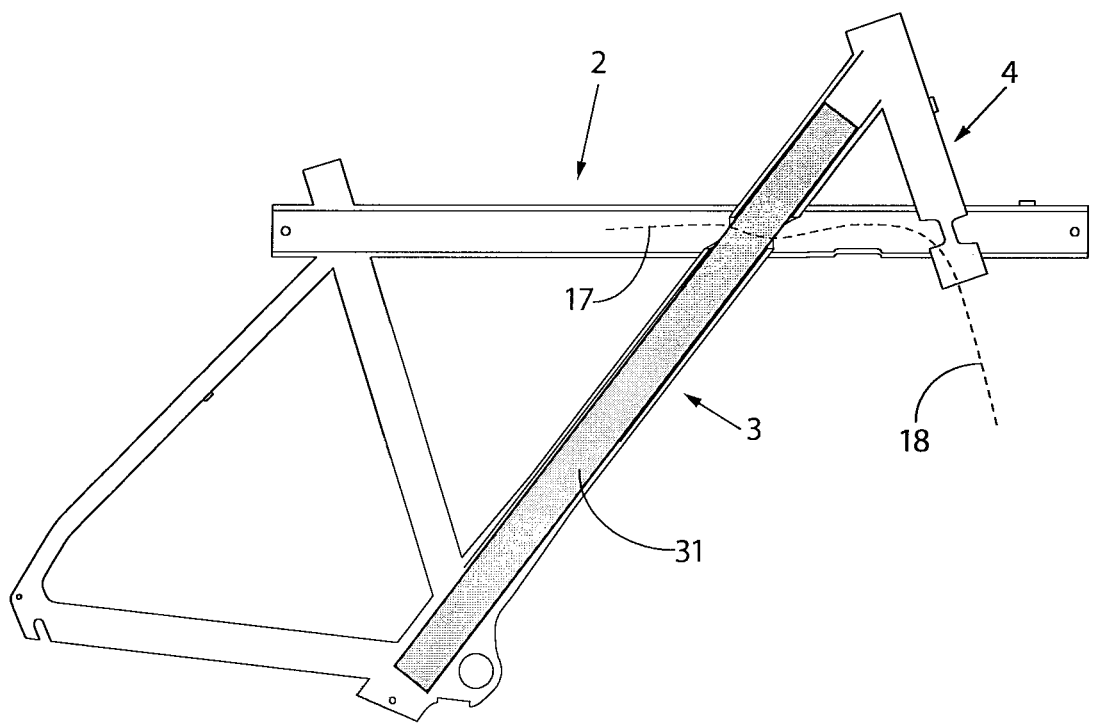

It is furthermore shown how the bicycle connector is inserted into the frame (FIG. 5). The bicycle connector is entered into the bottom tube from the bottom side and a brightly until the intersection between the bottom tube and the top tube where it is fastened by means of screw fastening 97. After the simple fastening operation by means of the screw fastening, the connector is ready for receiving of the respective cassette contacts. The screw fastening is advantageously achievable by means of the top opening 98 and the bottom opening 98' of the head tube 4.

For the purpose of mutual orientation of the convector contact, a bridge 26 is provided in which the connector contacts are fastened. Furthermore, the bridge is provided with a thread for the purpose of the screw fastening's 97.

For the purpose of connecting of the connector contacts with the subsystems outside the top tube cassette and the bottom tube cassette, wires are provided extending from the respective poles to the respective subsystems.

A tube intersection for two tubes from a tube construction of a frame for preferably a bicycle comprising two tubes that are crossing each other, wherein either at least one of the crossing tubes, preferably the thinner one, is provided with an opening for forming of a passage through this opening in the longitudinal direction of the thicker tube, or at least one of the two tubes at the location of the tube intersection is provided with a thickening, expansion, widening or swelling. Tube intersections according to the last sentence comprise any feature according to this description and or the attached claims thereof.

The present invention is described in the foregoing on the basis of several preferred embodiments. Different aspects of different embodiments can be combined, wherein all combinations which can be made by a skilled person on the basis of this document must be included. These preferred embodiments are not limitative for the scope of protection of this document. The rights sought are defined in the appended claims.

The invention claimed is:

1. A frame for a bicycle comprising a tube construction for providing fastening options for further parts of the vehicle, such as a steering pen, saddle pen and fastening means for a rear wheel, the tube construction comprising:
   a top tube, substantially extending in horizontal direction,
   a saddle tube, downwardly extending from a tube intersection with the top tube, from a fastening to the top tube at a substantially rear side thereof,
   a bottom tube, extending from a tube intersection with the saddle tube at substantially an underside of the saddle tube towards a connection at the top tube forwardly arranged relative to the fastening of the saddle tube to the top tube, and
   a head tube arranged at an angle by means of a tube intersection connected to the top tube,
   wherein the bottom tube extends to a predetermined distance above the upper side of the top tube, crossing the top tube at a tube intersection, and wherein the head tube is fastened to the bottom tube above the top tube,
   wherein the bottom tube is arranged for receiving a drive battery for providing energy to a drive engine of the bicycle, and wherein preferably the drive battery extends crossing the top tube.

2. The frame for a bicycle according to claim 1, wherein the interior of the bottom tube defines a continuous receiving space, preferably extending from a access opening at the bottom side of the bottom tube, for receiving in this receiving space of at least one utility component for the purpose of providing a function to the bicycle.

3. The frame according to claim 1, wherein the rear side of the top tube defines a receiving space extending from an access opening at the rear side thereof.

4. The frame according to claim 1, wherein the front side of the top tube defines a receiving space extending from an access opening at the front side thereof.

5. The frame according to claim 1, wherein a drive battery is suitable for providing energy to a drive engine of the bicycle is arrangeable, or is arranged, in the bottom tube.

6. The frame according to claim 1, wherein a crankshaft tube is arranged at the front side and/or bottom side of the bottom tube.

7. The frame according to claim 1, wherein the top tube is thicker than the bottom tube, and wherein at the tube intersection between the top tube and the bottom tube, the bottom tube extends through the top tube.

8. The frame according to claim 1, wherein the bottom tube is thicker than the top tube, and wherein at the tube intersection between the top tube and the bottom tube the top tube extends through the bottom tube.

9. The frame according to claim 1, wherein the top tube, preferably at the tube intersection with the bottom tube, is provided with a thickening, expansion, flare or swelling.

10. The frame according to claim 1, wherein the bottom tube, preferably at the tube intersection with the top tube, is provided with a thickening, expansion, flare or swelling.

11. The frame according to claim 1, wherein at a tube intersection, a thinner tube is provided with an opening for forming of a passage through this opening in the longitudinal direction of a thicker tube.

12. The frame according to claim 11, wherein the opening in the thinner tube is made by means of, a preferably transverse, through opening or by means of a removal of material from the wall of their thinner tube.

13. The frame according to claim 1, wherein the tube intersection between the top tube and the head tube comprises a passage, such as an opening for passing through of a cable, such as the energy supply cable for the drive engine.

14. The frame according to claim 1, wherein the top tube comprises a deepening or recess for arranging therein of a utility component, such as a control panel or display, preferably substantially aligned flush with the surface of the top tube.

15. The frame according to claim 1, wherein the top tube has a flat surface for thereto, on or in arranging of a utility component, such as a control panel or a display.

16. The frame according to claim 1, wherein the bottom tube is an accessory tube that is arranged for arranging therein subsystems of the vehicle.

17. The frame according to claim 1, wherein the top tube is an accessory tube that is arranged for arranging therein of subsystems of the vehicle for providing additional functionality to the vehicle.

18. The frame according to claim 1, wherein the top tube extends relative to the horizontal at an angle of maximally 20°.

19. The frame according to claim 1, further comprising a bicycle connector for connecting with a first cassette contact of a first bicycle cassette, the bicycle connector comprising:
    a first connector contact, comprising a number of connector poles, for connecting with the first cassette contact, and
    at least one output contact for connecting with a respective subsystem,
    wherein the bicycle connector is arrangeable in the respective first tube element of the tube assembly.

20. The frame according to claim 1, further comprising a bicycle connector for connecting with a first and a second cassette contact of the first bicycle cassette and a second bicycle cassette, the bicycle connector comprising:
    a second connector contact, comprising a number of second contact poles, for connecting with the second cassette contact, and
    a number of pole connectors, such as comprising wires, for connecting of at least a part of the number of first contact poles of the first cassette contact with at least a part of the second contact poles of the second connector contact.

21. The frame according to claim 20, further comprising a pole connector housing for protecting of at least a number of pole connectors, preferably being part of the bicycle connector.

22. The frame according to claim 20, wherein the bicycle connector comprises a bridging element for mutually connecting of the first connector contact with the second connector contact, preferably for the purpose of providing a mutual orientation.

23. The frame according to claim 20, wherein the first connector contact and/or the second connector contact comprises contact poles for the purpose of transferring a charging current to a battery and/or a charging current to a drive motor of the bicycle.

24. The frame according to claim 20, wherein the first connector contact and/or the second connector contact comprises contact poles for the purpose of transferring of an information signal or a control signal from a subsystem or to a subsystem.

25. The frame according to claim 23, further comprising a combination of contact poles for the purpose of a charging current and contact poles for the purpose of an information signal or a control signal.

26. The frame according to claim 20, wherein the bicycle connector comprises guide means for guiding and/or centering of the respective connector contact during mutual connection of the respective cassette contact and connector contact.

27. The frame according to claim 20, wherein the contact comprise pen contacts or ball contacts.

28. The frame according to claim 20, wherein the mutual relative sizing of the bicycle connector and at least one tube element is such that the bicycle connector is passable through this tube element.

29. The frame according to claim 28, wherein the bicycle connector is passable towards a coupling or bend between a first tube element and a second tube element for arrangement at the location of this coupling or bend for the purpose of providing a connector connection between the first tube element and the second tube element by means of the bicycle connector.

30. The frame according to claim 20, wherein the first cassette contact is functionally arrangeable in the top tube of the bicycle, and wherein the second cassette contact is functionally arrangeable in the bottom tube of the bicycle.

31. The frame according to claim 20, further comprising fastening means for fastening of the bicycle connector in a functional position.

32. The frame according to claim 31, wherein the fastening means are arranged and operable from the bottom side and/or the top side of the head tube.

33. The frame according to claim 20, wherein the first and second cassette contact are each arranged for a respective connection function, or wherein the first and second cassette contact are identical.

34. The frame according to claim 20, wherein the tube element and bicycle cassette have a guiding shape such that the cassette is arrangeable in the tube element in an orientation fitting with a finding connection between the cassette contact and the connector contact.

35. A bicycle connector according to claim 19 for a bicycle, comprising:
    a first connector contact, comprising a number of contact poles, for connecting with the first cassette contact, and
    at least in output contact for connecting with a respective subsystem,
    wherein the bicycle connector is arrangeable in the respective first tube element of the tube assembly.

36. The bicycle connector according to claim 34, further comprising:
    a second connector contact, comprising a number of second contact poles, for connecting with the second cassette contact, and
    a number of pole connectors, such as comprising wires, for connecting of at least a part of the first contact poles of the first cassette contact with at least a part of the number of second contact poles of the second connector contact.

37. The bicycle connector according to claim 35, further comprising a bridging element for mutually connecting of the first connector contact with the second connector contact, preferably for the purpose of providing a mutual orientation.

\* \* \* \* \*